Figure 1:
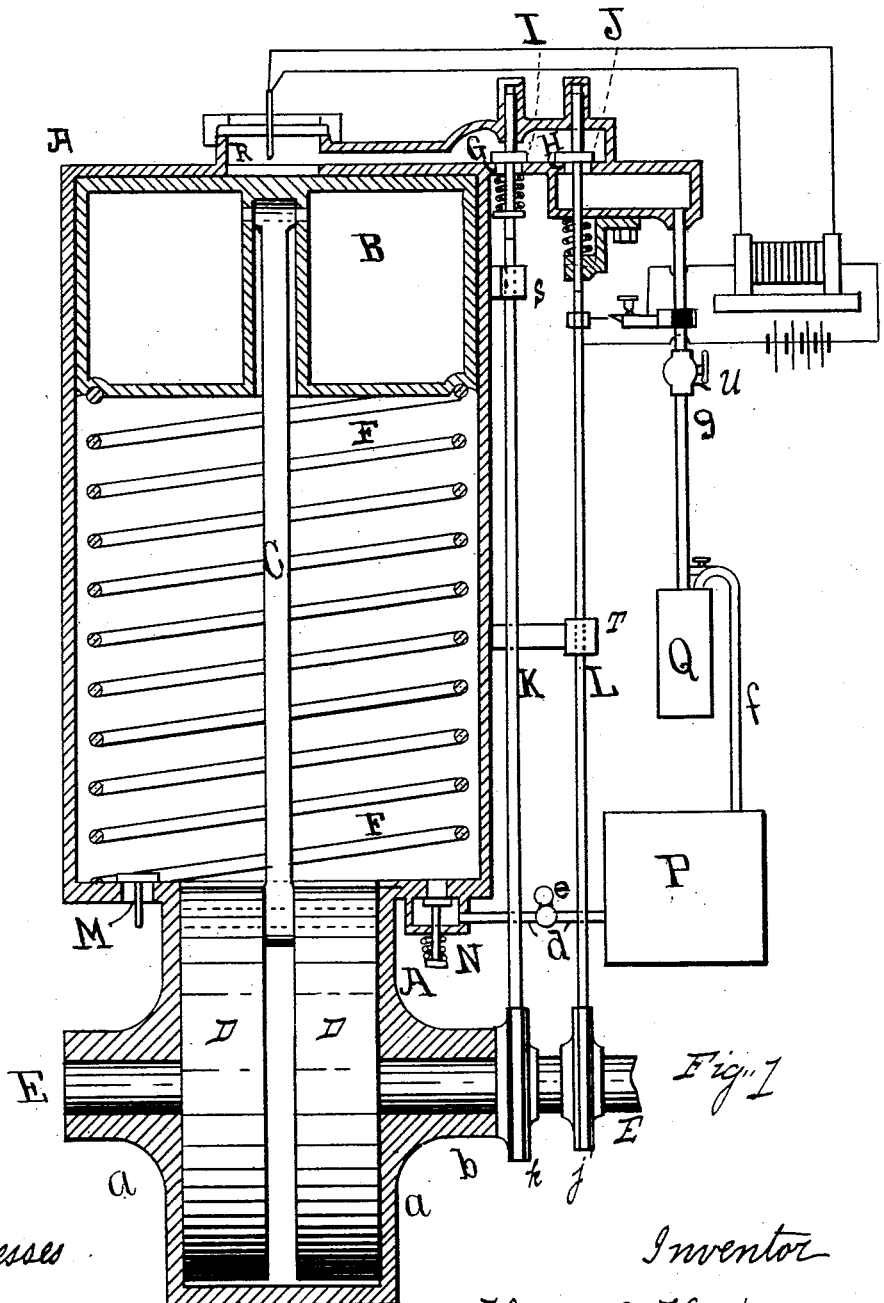

(No Model.) 2 Sheets—Sheet 1.

H. C. HART.
GAS ENGINE.

No. 588,061. Patented Aug. 10, 1897.

Witnesses
Amelia J. Williams
Elliott Stoddard

Inventor
Henry C. Hart
by Geo. H. Lothrop
atty

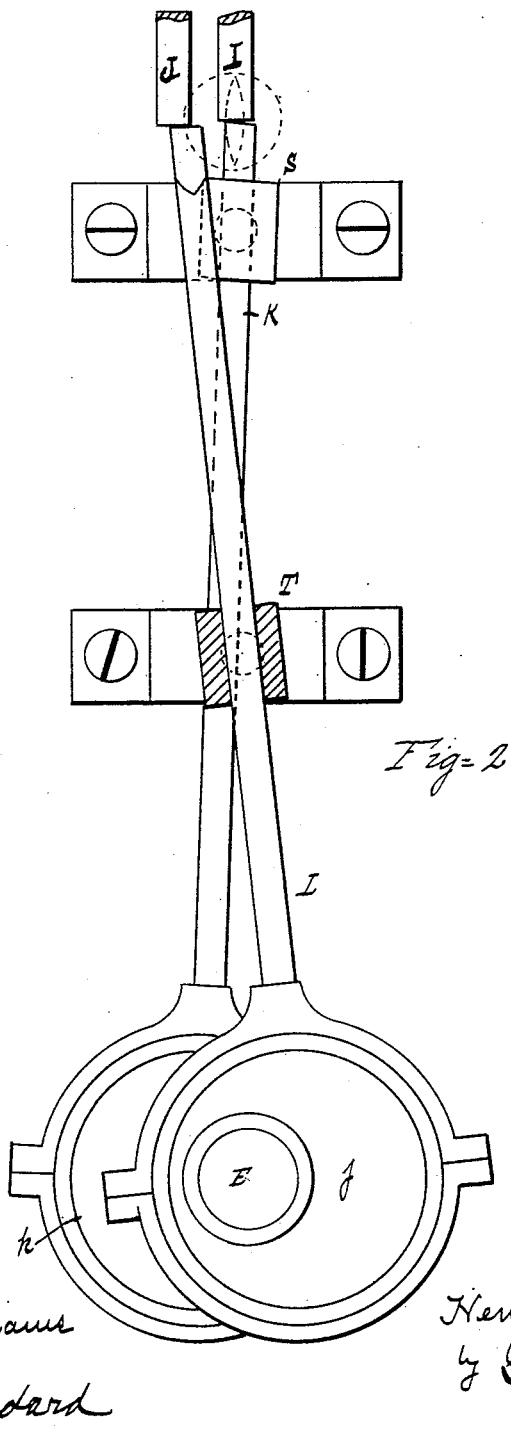

UNITED STATES PATENT OFFICE.

HENRY C. HART, OF DETROIT, MICHIGAN, ASSIGNOR TO THE HENRY C. HART MANUFACTURING COMPANY, OF SAME PLACE.

GAS-ENGINE.

SPECIFICATION forming part of Letters Patent No. 588,061, dated August 10, 1897.

Application filed May 17, 1894. Serial No. 511,532. (No model.)

*To all whom it may concern:*

Be it known that I, HENRY C. HART, of Detroit, in the county of Wayne and State of Michigan, have invented a new and useful Improvement in Gas-Engines, of which the following is a specification.

This invention relates to explosive-engines having pistons connected with the cranks or eccentrics of shafts carrying balance or fly wheels.

The chief object of my present invention is to provide novel, simple, efficient, and economical means whereby a crank or eccentric connected engine operated by explosive charges will automatically regulate its own speed under a varying load.

The invention also has for its object to provide a new and improved explosive-engine for a special purpose, such as operating the propeller of a marine vessel, whereby it is possible to materially reduce the size of the fly-wheel, while securing a steady-running engine in which an impulse is given to the piston at each half-revolution of the engine-shaft.

Figure 1 is an elevation of a gas-engine embodying my invention, showing the cylinder in section; and Fig. 2 is a detail view of the valve-operating mechanism.

A is a cylinder closed at both ends, and B is a piston fitted in said cylinder.

E is the main shaft of the engine.

The shaft E passes through the walls $a\,a$ of the cylinder A and rests in bearings $b\,b$. Said bearings are fitted to the shaft E, so that there shall be no considerable leak around said shaft.

D D are disks keyed upon the shaft E, inside of the cylinder A.

C is a connecting-rod pivoted to the piston B at one end and between the disks D D by the usual wrist-pin at the other end.

P is a reservoir for compressed air.

$d$ is a pipe connecting the reservoir P with the cylinder A beneath the piston B.

$e$ is a throttle valve or cock in the pipe $d$.

Q is a carbureter.

$f$ is a pipe connecting the carbureter Q with reservoir P.

$g$ is a pipe connecting the carbureter Q with the cylinder A above the piston B.

U is a throttle-valve in the pipe $g$.

F is a spring resting upon a shoulder on the cylinder A at its lower end and pressing upward on the piston B.

M is a valve adapted to open to admit air from the outside into the cylinder A beneath the piston B when the pressure of the outside air is greater than that of the inside air.

N is a valve adapted to open to let the air in the cylinder A pass into the pipe $d$ and thence into the reservoir P whenever the pressure of the air in said cylinder is greater than that of the air in said reservoir.

G is the exhaust-port, and H the inlet-port, of the engine.

I is a valve-covering port G, and J is a valve-covering port H. The valve J is held upon its seat against the pressure of the air that has become an explosive mixture in passing through the carbureter Q by a spring. The valve I is also preferably forced down upon its seat by a spring in order to secure promptness of action.

K L are rods adapted to reciprocate in the directions of their lengths through pivoted sleeves S and T, respectively. The lower ends of the rods K L are secured by the usual straps to the eccentrics $k\,j$ upon the shaft E.

The operation of the above-described device is as follows: Suppose the air in the reservoir P to be at the required pressure—say thirty pounds above the atmosphere. The air from the reservoir P passes through the pipes $f$ and $g$ and presses against the under side of the valve J, though not with sufficient force to raise said valve against the action of its spring. Part of said air passes through the carbureter Q, so that when it reaches the port H it is an explosive mixture. As the shaft E turns the upper end of the rod L strikes against the end of the stem of the valve J and raises said valve just as the piston B begins to descend. When said piston has descended a sufficient distance to allow the required amount of "fill," the end of the rod L is withdrawn by its sidewise motion (see dotted lines, Fig. 2) from the stem of the valve J, allowing said valve to return to its seat under the action of its spring. The charge is then ignited by an electric spark at R, or otherwise. The piston B is driven down by the force of the explosion, compressing the spring F and the air beneath said piston. When the pressure of the air under the piston B exceeds that of the air in the reservoir P, the valve N opens, allowing air to pass from the cylinder A to the reservoir P. When the piston B has reached its lowest point and as it ascends, the rod K strikes against the stem of the valve I, raising said valve and permitting the products of combustion to escape. The piston B is driven upward by the pressure of the spring F and that of the compressed air left in cylinder A beneath the piston B. The engine may be stopped by closing the throttle-valve U, and because of the pressure of the spring F the piston will always stop with the piston B at the end of its travel, where it may be started again by opening the throttle-valve U, turning the shaft E slightly and permitting the compressed explosive mixture to force said piston down to the point at which the charge is ignited.

As the permanent spring F always returns the piston to the commencement of its working stroke when the engine is stopped the balance or fly wheel cannot stop at any intermediate point, but when its momentum is expended it will always stop in the same position with the piston in position to commence a working stroke, so that the engine is readily started by opening the throttle-valve. In all explosive-engines having crank-connected pistons of which I am aware the balance or fly wheel is liable to stop at any point or time in its revolution when its momentum is expended, and consequently the piston will rarely, if ever, stand in proper position for the commencement of a working stroke when the engine is to be started. This is objectionable and is entirely avoided by my invention.

The cock e serves to adjust the size of the passage through the pipe d. The amount of air that passes from the cylinder A to the reservoir P at each stroke depends upon the size of the opening through the pipe d and upon the time during which the air in said cylinder is at a greater pressure than the air in said reservoir.

The space in the cylinder occupied by the explosive mixture at the time of ignition is always the same, so that the quantity of explosive mixture taken in at each stroke will depend upon the degree of compression of such explosive mixture, which depends upon the amount of pressure in the reservoir P. Now if less air is supplied to the reservoir P at each stroke than is taken out to supply the charge the pressure in said reservoir will fall, the quantity of explosive mixture taken in at each stroke will be less, and therefore the power of the engine will be less.

Now if the opening in pipe d is adjusted by the cock e, so that sufficient air will be supplied to the reservoir P at a certain speed of the engine when the engine is developing a certain power, if the speed exceeds that amount there will be more air used from the reservoir P than is supplied to it. The pressure, and therefore the amount of explosive mixture taken in at each stroke, will be diminished, and therefore the power exerted by the engine will be less, so that the rate of rotation of the shaft E will fall. On the contrary, if the engine is going too slow more air will be supplied to the reservoir than is withdrawn, and the power, and consequently the speed of the engine, will be increased, so that in this way the speed and power of the engine will be automatically regulated.

It will be noticed that there is an impulse given to the piston B at each half-revolution of the main shaft, so that great steadiness of running may be secured, and a comparatively small fly-wheel will be sufficient.

The object of the described valve-motion is to enable me to use the so-called "liberating-valve." A mechanic will readily understand that by the arrangement shown the path of rods L and K may be widely varied, first, by varying the distance of the guide S or T from the eccentric, and, second, by permitting the guide S or T to reciprocate in ways, thus constantly maintaining the same proportion between the two arms of the eccentric-rod. Thus the path of the upper end of the eccentric-rod may be a circle or an ellipse, as desired for any particular engine to which it is applied.

What I claim as my invention, and desire to secure by Letters Patent, is—

1. The combination, with a gas-engine cylinder, closed at both ends, and having an air-inlet and an air-outlet at one end, a piston working in the cylinder, a compressed-air reservoir, and means for converting air withdrawn from the reservoir into explosive mixture, of a passage-way leading from the said air-outlet of the cylinder to the compressed-air reservoir and having an adjustable valve for varying the quantity of air which flows therethrough from the cylinder to the compressed-air reservoir, substantially as and for the purposes described.

2. The combination, with a gas-engine cylinder, closed at both ends, and having an air-inlet and an air-outlet at one end, a piston working in the cylinder, a compressed-air reservoir, and means for converting air withdrawn from the reservoir into explosive mixture, of a controllable passage-way for varying the quantity of air flowing from the cylinder to the reservoir, substantially as and for the purposes described.

HENRY C. HART.

Witnesses:
H. BYRON SCOTT,
ELLIOTT J. STODDARD.